UNITED STATES PATENT OFFICE.

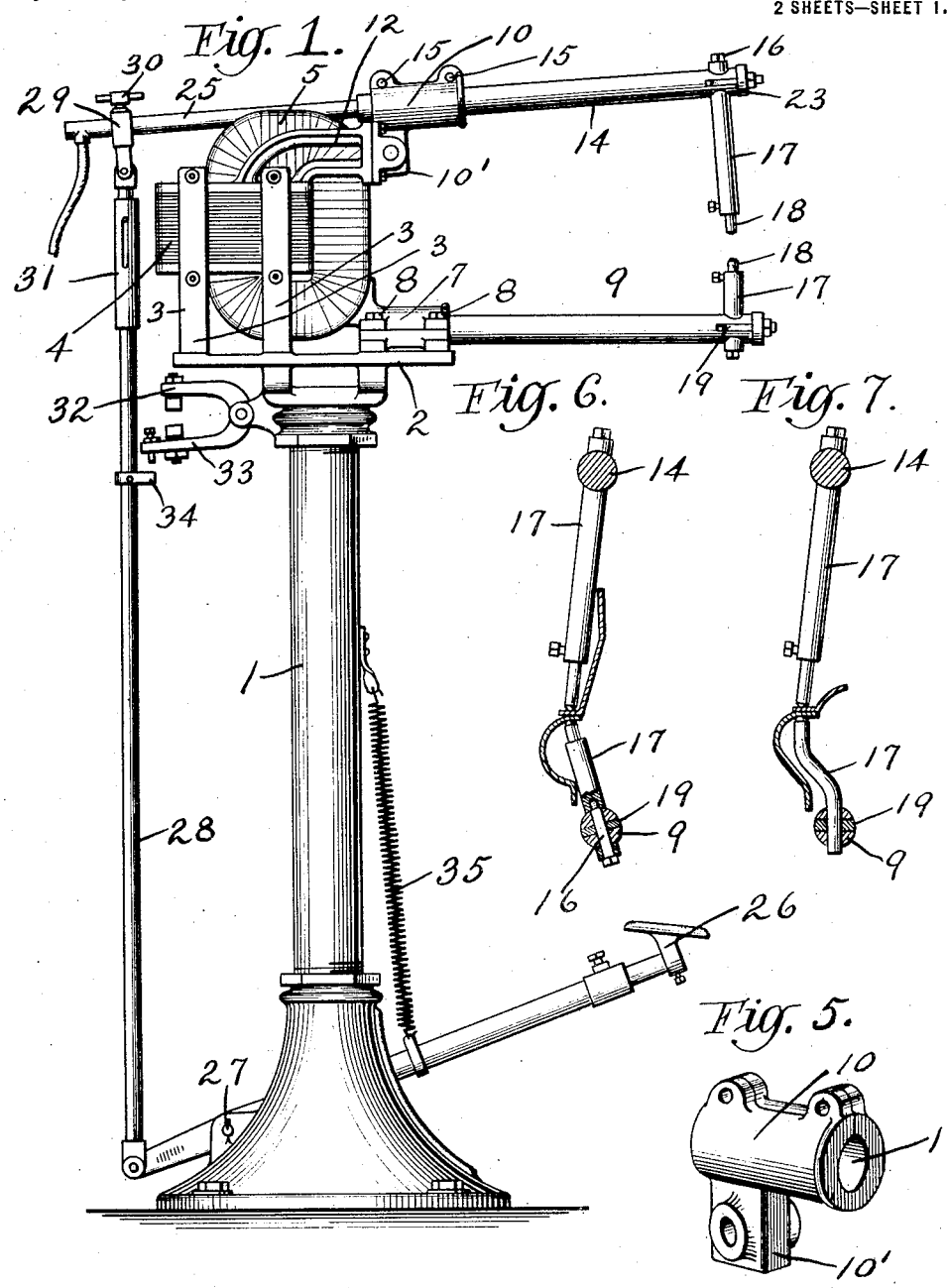

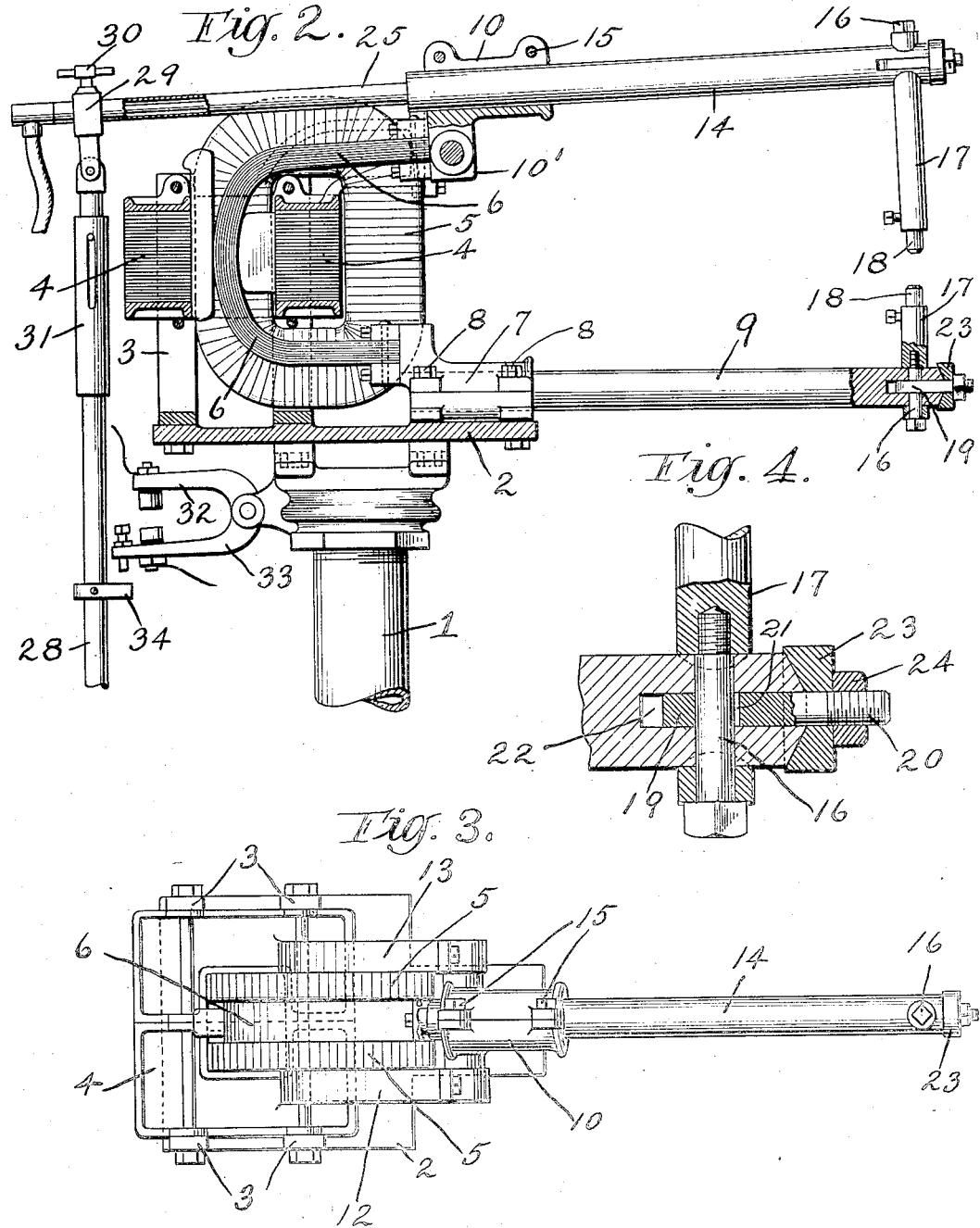

LAURENCE S. LACHMAN, OF NEW YORK, N. Y., ASSIGNOR, BY MESNE ASSIGNMENTS, TO THOMSON SPOT WELDER COMPANY, OF BOSTON, MASSACHUSETTS, A CORPORATION OF MASSACHUSETTS.

ELECTRIC WELDING-MACHINE.

1,228,450.  Specification of Letters Patent.  Patented June 5, 1917.

Application filed September 17, 1915. Serial No. 51,129.

*To all whom it may concern:*

Be it known that I, LAURENCE S. LACHMAN, a citizen of the United States, and a resident of New York, in the county of New York and State of New York, have invented certain new and useful Improvements in Electric Welding-Machines, of which the following is a specification.

My present invention relates to electric welding machines and particularly to that class of welding machines known as "spot welders."

The object of the invention is to attain simplicity of construction and operation and at the same time increase the efficiency and the utility of machines of this class.

According to this invention the length of the secondary circuit may be varied in a very simple manner and the angularity of the spot welding electrodes readily and quickly altered to meet the conditions arising when joining pieces of metal of odd shapes.

To these ends the invention consists in the new and novel parts, combinations and arrangements of parts in an electric welding machine as hereinafter more particularly described and then specified in the claims.

In the acompanying drawings Figure 1 is a side elevation of an electric welding machine constructed in accordance with this invention.

Fig. 2 is an enlarged side elevation of the upper part of the machine, the transformer being shown in section.

Fig. 3 is a plan view of the upper part of the machine, parts being broken away.

Fig. 4 is an enlarged cross-section through the contact-electrode-carrying end of the supporting arms.

Fig. 5 is a perspective view of the terminal block forming the mounting of the upper supporting arm.

Figs. 6 and 7 illustrate different styles of contact electrodes in engagement with different shaped work.

In the drawings 1 indicates the standard or pedestal upon which the various parts of the machine are supported. 2 indicates a table or platform secured on the top of the pedestal and having standards 3 rising therefrom and supporting the core 4 of the transformer, the primary coils of which are indicated at 5. The secondary of the transformer may be of any desired type and is herein shown as the wellknown flexible secondary 6 composed of a plurality of laminations disposed between the two sets of primary coils 5.

The lower end of the flexible secondary terminates in and is secured to a block 7 of good conducting material. The block 7 is mounted upon but insulated from the table 2 and is provided with a circular bore running longitudinally thereof and in which a forwardly projecting arm 9 of any desired length is seated. The arm 9 preferably of copper is circular in cross-section and is capable of sliding in and out longitudinally of the bore in the block 7 as well as being capable of rotating therein. The one side of the block is slit longitudinally to the bore so that when the arm has been placed in the desired adjusted position it is securely clamped in the block 7 by clamping bolts 8.

The other end of the transformer secondary 6 terminates in a block 10 of good conducting material. The block 10 is provided with a longitudinal circular bore 11 (Fig. 5) and a slitted side as in the case of the block 7. A depending lug 10' of the block 10 serves to pivotally connect the block to side supporting arms 12, 13 by means of which the block 10 is supported. A round copper bar or arm 14 of any desired length is seated and supported in the bore 11 of the block 10, the arm projecting forwardly from the machine directly over the arm 9. The arm 14 is also free to slide in the block and be rotated but is normally held against such movement by clamping bolts 15.

The forward end of each of the arms 9 and 14 is provided with a laterally projecting pin-shaped contact electrode opposed each to the other for engaging opposite surfaces of the work to be welded. The contact electrodes may be of any desired character and secured to the arms in any suitable manner to be supported and carried thereby but by preference the end of each arm is arranged and adapted for holding the contact as shown in Fig. 4 as by this construction electrodes of various diameters can be readily employed. A transverse hole is provided in the arm near the end into which a clamping bolt 16 is inserted. The bolt projects through the arm and engages the end of the contact electrode 17 and clamps it against the arm. By this construction contact electrodes of any desired size may be clamped to the arms and provided with replaceable contacts 18 as shown in Figs. 1 and 2 but if only a thin electrode is necessary or desirable, the bolt 16 is not used, the electrode itself entering the bolt hole as shown in the lower arm in Fig. 7. To clamp this electrode an endwise clamping device is used which consists of a disk 19 having a threaded shank 20. The disk is provided with a hole 21 through which the electrode passes and is located in a slot 22 formed in the arm transverse to the electrode. A plate 23 having a depression with inclined walls which ride on inclined surfaces formed on the end of the arm is forced up against the end of the arm by a nut 24 on the threaded shank of the disk 19. The drawing out of the disk by the action of the nut 24 clamps the electrode in the bolt hole of the arm while the inclined surfaces tend to clamp the split end of the arm against the surfaces of the disk and squeeze them together.

The upper arm 14 is provided with a rearward extension 25 which may if desired also provide water circulation for the arm.

26 indicates a treadle pivoted at 27 to the pedestal 1 and connected to the extension 25 from the arm 14 by a link 28 pivoted to the treadle at one end and to the extension 25 by a clamping device 29 so arranged that by loosening the clamping nut 30 thereof the bar 14 and extension 25 will be free, when loose in the block 10, to be drawn back or forth. As will be obvious by depressing the treadle the upper contact 17 will be forced toward the lower contact and the work located between them engaged for the welding action. If desired to provide a yielding pressure to the work, a spring is inserted in a tube 31 joining two sections of the link 28 and through which pressure from the treadle 26 must be transmitted to the work.

32 and 33 indicate coöperating switch members mounted on the pedestal 1 and connected in the primary circuit of the transformer as is well understood in the art and which control the supply of welding current to the work. A projection 34 on the link 28 engages one of the switch members when the treadle is depressed and forces the two members together at about the time the contact electrodes close on the work. When the treadle is released the spring 35 returns it to normal position and the downward travel of the link 28 allows the switch members to separate and break the circuit.

In Figs. 6 and 7 the arms 9 and 14 are shown rotatively adjusted to accommodate the contacts to different shapes of work to be welded. By loosening the bearings in the terminal blocks 7 and 10 the distance of the contacts 17 from the transformer or in other words the distance the supporting arms 9 and 14 project may be varied to accommodate different sizes of work, the object being to keep as short a secondary circuit as possible. At the same time the arms may be rotated if desired to give any necessary inclination to the contact electrodes.

It will be understood that the details of construction and arrangement of parts may be widely varied without departing from the spirit of the invention as expressed in the appended claims.

What I claim as my invention is:—

1. In an electric welding machine, the combination with the transformer, of a projecting arm secured to each terminal of the secondary of said transformer, contact electrodes mounted in the ends of said arms for engaging opposite surfaces of the work and means for varying the length of the projecting portions of both said arms from the machine within a wide range of travel.

2. In an electric welding machine, the combination with the transformer secondary, of an arm secured to each terminal of said secondary and projecting forward from the machine, a contact electrode mounted in the end of each arm for engaging opposite surfaces of the work and means for moving said contacts to and from each other, said arms both having a sliding engagement with the secondary terminals whereby the distance of said contacts from the machine may be shortened or lengthened an appreciable extent.

3. In an electric welding machine, the combination with the transformer secondary, of a block secured to each terminal of said secondary and a projecting arm mounted in each of said blocks, said arms being both bodily slidable in said blocks to vary the extent of the projecting portion a considerable distance.

4. In an electric welding machine, the combination with the transformer secondary, of a block secured to each terminal thereof, a projecting arm circular in cross-section mounted in each of said blocks, said arms being bodily slidable and rotatable in said blocks whereby said arms may be adjusted to extend from the front of the machine to various distances within a wide range of travel and contact electrodes carried by the ends of said arms.

5. In an electric welding machine, the combination with the transformer secondary, of a projecting arm secured to each terminal thereof, said arms being bodily slidable in said terminals to vary the extent of the projecting portion a considerable distance and pin-shaped contacts secured to the ends of said arms, said arms being also capable of being rotated in said terminals to vary the angular position of said contacts.

6. In an electric welding machine, the combination with the transformer secondary, of blocks secured to each terminal thereof in such position that an open space is presented through to the back of the machine, one of said blocks being pivotally connected thereto, a projecting arm journaled in each of said blocks whereby said arm may be bodily moved longitudinally and rotatively, means for clamping said arms in said blocks in adjusted position, pin-shaped contacts at the end of said arms and means for swinging the pivoted block to cause said contacts to grip the work between them.

7. In an electric welding machine, the combination with the transformer secondary, of blocks secured to each terminal thereof, one of said blocks being pivotally connected thereto, a projecting arm journaled in each of said blocks whereby said arm may be bodily moved longitudinally and rotatively, means for clamping said arms in said blocks in adjusted position, pin-shaped contacts at the end of said arms, means for swinging the pivoted block to cause said contacts to grip the work between them and a switch element operatively connected to a rearward extension of the movable arm.

8. In an electric welding machine, the combination with the transformer secondary, of a block secured to each terminal thereof, a projecting arm circular in cross-section mounted in each of said blocks, said arms being bodily slidable and rotatable in said blocks, contact electrodes carried by the ends of said arms, a rearward extension adapted to telescope in one of said arms, a switch element and an operating device operatively connecting said latter-named arm and said switch element.

Signed at New York, in the county of New York and State of New York, this 12th day of July, A. D. 1915.

LAURENCE S. LACHMAN.